(12) United States Patent
Biondi et al.

(10) Patent No.: US 10,932,473 B2
(45) Date of Patent: Mar. 2, 2021

(54) FEEDING UNIT FOR FEEDING A FOOD PRODUCT

(71) Applicant: AZIONARIA COSTRUZIONI MACCHINE AUTOMATICHE A.C.M.A. S.p.A., Bologna (IT)

(72) Inventors: Andrea Biondi, Bologna (IT); Riccardo Ruggeri, Bologna (IT); Ivanoe Bertuzzi, Casalecchio di Reno (IT)

(73) Assignee: AZIONARIA CONSTRUZIONI MACCHINE AUTOMATICHE A.C.M.A. S.P.A.

( * ) Notice: Subject to any disclaimer, the term of this patent is extended or adjusted under 35 U.S.C. 154(b) by 44 days.

(21) Appl. No.: 16/315,851

(22) PCT Filed: Jul. 11, 2017

(86) PCT No.: PCT/IB2017/054162
§ 371 (c)(1),
(2) Date: Jan. 7, 2019

(87) PCT Pub. No.: WO2018/011704
PCT Pub. Date: Jan. 18, 2018

(65) Prior Publication Data
US 2019/0239520 A1  Aug. 8, 2019

(30) Foreign Application Priority Data
Jul. 11, 2016 (IT) .................. 102016000071560

(51) Int. Cl.
*A21C 9/06* (2006.01)
*G01F 11/02* (2006.01)
(Continued)

(52) U.S. Cl.
CPC .................. *A21C 9/06* (2013.01); *A21C 5/02* (2013.01); *G01F 11/021* (2013.01); *G01F 13/005* (2013.01)

(58) Field of Classification Search
CPC ..................................... A21C 9/06; A21C 5/02
See application file for complete search history.

(56) References Cited

U.S. PATENT DOCUMENTS 2,185,701 A  *  1/1940  Boyle .................... B29O 48/34
                                                                118/405
3,434,630 A       3/1969  Lee et al.
(Continued)

FOREIGN PATENT DOCUMENTS

DE       4305612 A1    8/1994
EP       0003394 A2    8/1979
NL       1000913 C2  * 2/1997  ............... A21C 5/02

OTHER PUBLICATIONS

International Search Report and Written Opinion dated Sep. 21, 2017 from counterpart PCT App PCT/IB2017/054162.

*Primary Examiner* — Timothy Kennedy
(74) *Attorney, Agent, or Firm* — Shuttleworth & Ingersoll, PLC; Timothy J. Klima

(57) ABSTRACT

A feeding unit for feeding a food product for a machine for making filled pasta includes at least one feed duct having an outlet and an inlet; a sleeve fitted coaxially over the duct and rotatable relative thereto about an axis of rotation R in order to regulate the cross section of the inlet; an actuator including a stem inserted in the sleeve and movable between a first, retracted operating position and a second, extracted operating position to allow the food product to enter the feed duct and to push at least one single portion of food product out of the duct through the outlet; a second sleeve, fitted (Continued)

between the first sleeve and the stem, the stem sliding inside the second sleeve and the first sleeve rotating on the second sleeve.

9 Claims, 4 Drawing Sheets

(51) Int. Cl.
  *G01F 13/00* (2006.01)
  *A21C 5/02* (2006.01)

(56) References Cited

U.S. PATENT DOCUMENTS

| | | | | |
|---|---|---|---|---|
| 3,806,293 | A | * | 4/1974 | Taureck ............... B29C 48/08 |
| | | | | 425/209 |
| 5,419,464 | A | * | 5/1995 | Ganrot ................. A21C 9/04 |
| | | | | 222/380 |
| 5,624,696 | A | * | 4/1997 | Watanabe ............. A21C 3/04 |
| | | | | 425/149 |
| 6,161,733 | A | | 12/2000 | King |

* cited by examiner

FEEDING UNIT FOR FEEDING A FOOD PRODUCT

TECHNICAL FIELD

This invention relates to a feeding unit for feeding a food product preferably intended for a machine for making filled pasta.

More specifically, this invention has for an object a feeding unit for feeding a filling, which this description expressly refers to but without losing in generality, intended for a machine for making filled pasta such as, for example, tortellini, tortelloni, ravioli and the like.

In this specification, reference is made by way of example, and for simplicity of description, to a unit of the abovementioned type operating in a machine for making filled pasta, without thereby limiting the scope of the invention.

BACKGROUND ART

In prior art machines for making filled pasta, at least one sheet of dough is fed to a filling station where suitable portions of filling are wrapped in the sheet to form individual pieces of filled pasta.

Machines for making filled pasta comprise a feeding unit for feeding the filling to the filling station.

In one example embodiment of it, the unit for feeding the filling comprises a plurality of distinct feed ducts, each having an inlet made on the lateral surface of the duct and from which it receives the filling, and an outlet leading to the filling station and located substantially at the sheet of dough.

For each duct, prior art feeding units comprise an actuator—pneumatic, for example—designed to push the individual portions, or charges, of filling out of it towards the filling station.

Each actuator comprises a stem which, like the feed duct, is circular in cross section to push the filling towards the outlet of the duct.

The filling is fed to the feed ducts by a screw feeder which pushes it out of a hopper towards the inlets of the ducts through a single feed channel.

In order to adjust the amount of filling that can be inserted into each individual duct, whose inlet is opened by moving the stem, the feeding device comprises a bushing fitted round the stem and inserted between the stem and the duct.

The bushing, which is circular in cross section, is rotatable on the stem, which also has a circular cross section, in such a way as to vary the portion of the duct inlet traversable by the filling.

It is thus possible to adjust the cross section size of the duct inlets to try to obtain the same quantity of product at all the outlets, whether close to or far from the hopper.

One drawback of prior art filling feeding units is that when making filled pasta—for example ravioli—that is particularly large or elongate in shape, this type of feeding system is unsatisfactory.

Large quantities of filling are difficult to move uniformly along the feed ducts of known type. More precisely, despite numerous workarounds developed up to now, it remains difficult both to deliver a preset amount of filling to all the ducts, irrespective of their position relative to the screw feeder and hopper, and to distribute the filling uniformly on the ravioli in the filling station, at the outlet of each duct.

Moreover, it is relatively difficult for particularly large quantities of filling to be transferred to the dough after being discharged from the corresponding duct.

DISCLOSURE OF THE INVENTION

In this context, the main technical purpose of this invention is to propose a feeding unit for feeding a food product to overcome the above mentioned drawbacks.

One aim of this invention is to propose a filling feeding unit which allows the filling to be metered precisely even when the filled pasta being made is of a relatively large type.

Another aim of the invention is to propose a filling feeding unit in machines for making filled pasta where the filling can be transferred to the dough in optimum manner even when the charges of filling are particularly large.

BRIEF DESCRIPTION OF THE DRAWINGS

Further features of the invention and its advantages are more apparent in the non-limiting description below, with reference to a preferred but non-exclusive embodiment of a filling feeding unit as illustrated in the accompanying drawings, in which.

DETAILED DESCRIPTION OF PREFERRED EMBODIMENTS OF THE INVENTION

Figure 1:
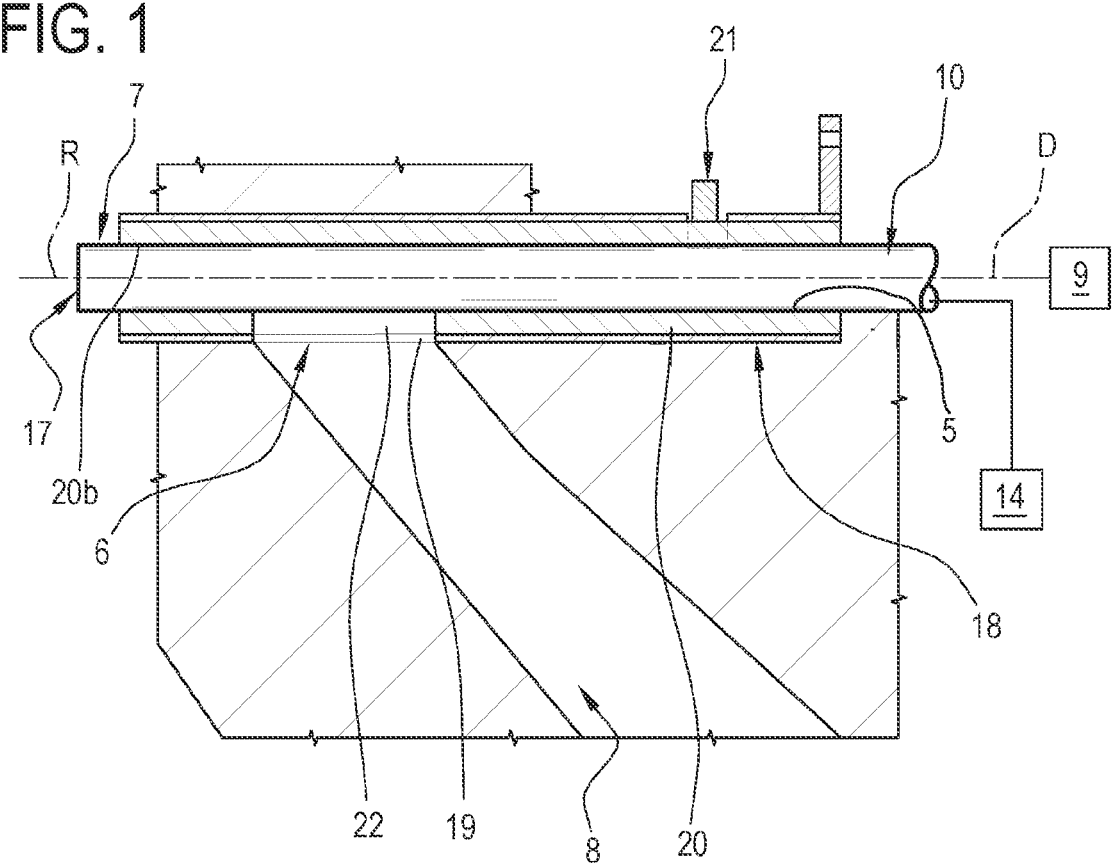
FIG. 1 illustrates a feeding unit according to this invention in a schematic cross sectional side view, partly in blocks and with some parts cut away for greater clarity.

With reference in particular to FIG. 1, the numeral 1 denotes a feeding unit for feeding a food product.

The unit 1 is in particular intended for a machine of substantially known type for making filled pasta such as, for example, tortellini, tortelloni or ravioli, and the food product moved is, for example, a filling 2 for this type of pasta.

In one embodiment of prior art machines for making filled pasta, a sheet of dough 100 is fed to a filling station 200 where suitable portions of filling 2, dispensed by a feeding unit 1 like the one forming the object of this invention, are wrapped in portions of the sheet of dough to form individual pieces of filled pasta.

The unit 1 comprises a hopper 3 for storing the filling 2, and a screw feeder 4 for moving the filling 2 from the hopper 3 to the filling station 200.

The unit 1 comprises a plurality of feed ducts 5 for feeding the filling to the filling station 200 and each having a main direction of extension D, an inlet 6 and an outlet 7.

For convenience, reference is hereinafter made to only one duct 5 since the technical features of the ducts 5 are all the same.

A feed channel 8 places the hopper in communication with the inlets 6 of the ducts 5 and the screw feeder 4 forces the filling from the hopper along the channel 8 towards the inlets 6 and the ducts 5.

As illustrated, the unit 1 comprises, for each duct 5, an actuator or expeller to push the filling 2 fed into it by the screw feeder 3 out of the duct 4.

The actuator essentially comprises a sheath, schematically represented as a block 9 in FIG. 1, and a stem 10, inserted in the duct 4 and movable along the main direction of extension D between a first, retracted operating position and a second, extracted operating position to expel the filling 2 from the duct 5.

Preferably, when the stem 10 is at the first operating position, the inlet 6 of the duct 5 is open, whereas when the stem 10 is at the second operating position, the inlet 6 is closed and the filling 2 is pushed to the outlet 7.

Figure 2:
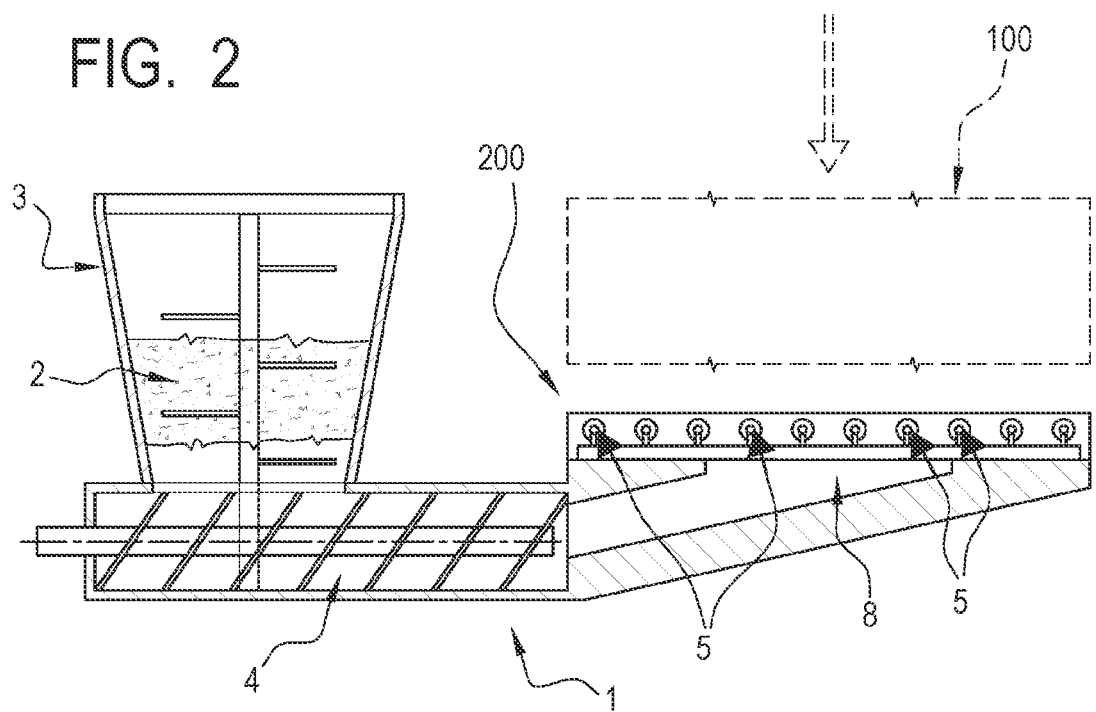
FIG. 2 is a schematic, cross sectional view, with some parts cut away for greater clarity, of the feeding unit of FIG. 1.

In the preferred embodiment illustrated, the cross section of the stem 10 at right angles to the direction D is oval in shape and, looking at FIG. 2, extends preferably horizontally.

Figure 3:
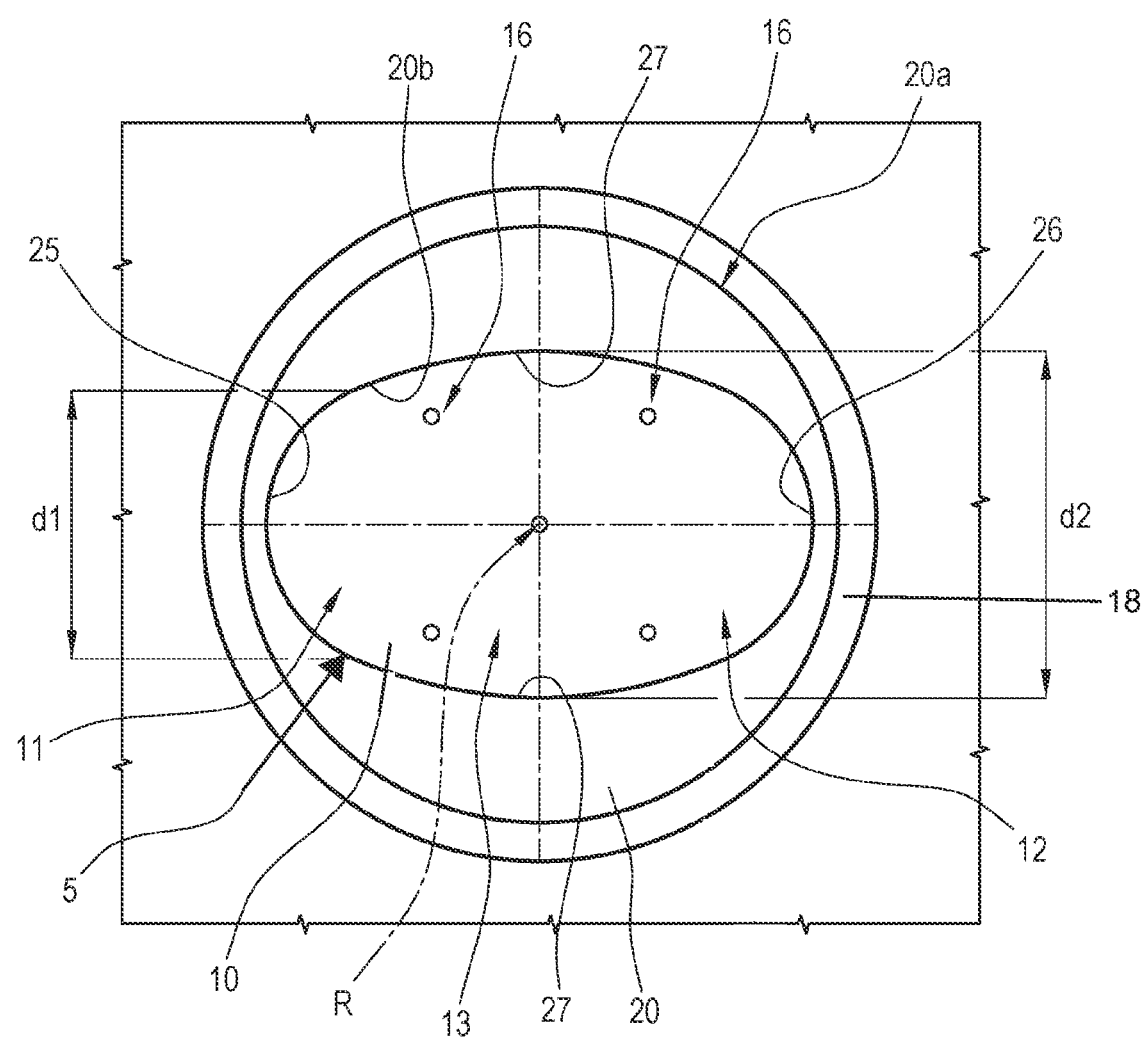
FIG. 3 illustrates a detail of the unit of FIG. 1 in a schematic front view, with some parts cut away for greater clarity.

With reference to FIG. 3, the cross section of the stem 10 has a first and a second end portion 11, 12, both preferably having a circular profile whose diameter d1 is preferably between 6 mm and 18 mm.

The cross section of the stem 10 has a central portion 13 having an at least partly circular profile whose diameter d2 is between 8 mm and 20 mm.

In the preferred embodiment illustrated, the unit 1 comprises a blowing system, schematically represented as a block 14.

Each stem 10 comprises a plurality of ducts 15—five in the example illustrated—in communication with the system 14, in order to blow a jet of air at a charge of filling 2 to be expelled from the duct 5.

In effect, each duct 15 has an outlet 16 located at one end 17 of the stem 10 and designed to operate against the filling 2 from the side opposite the sheath 9.

The outlets 16 face the duct 5 in such a way that the air jet acts on the filling 2 being pushed along the duct 5 itself, particularly the moment when it is expelled from the duct 5.

Figure 5:
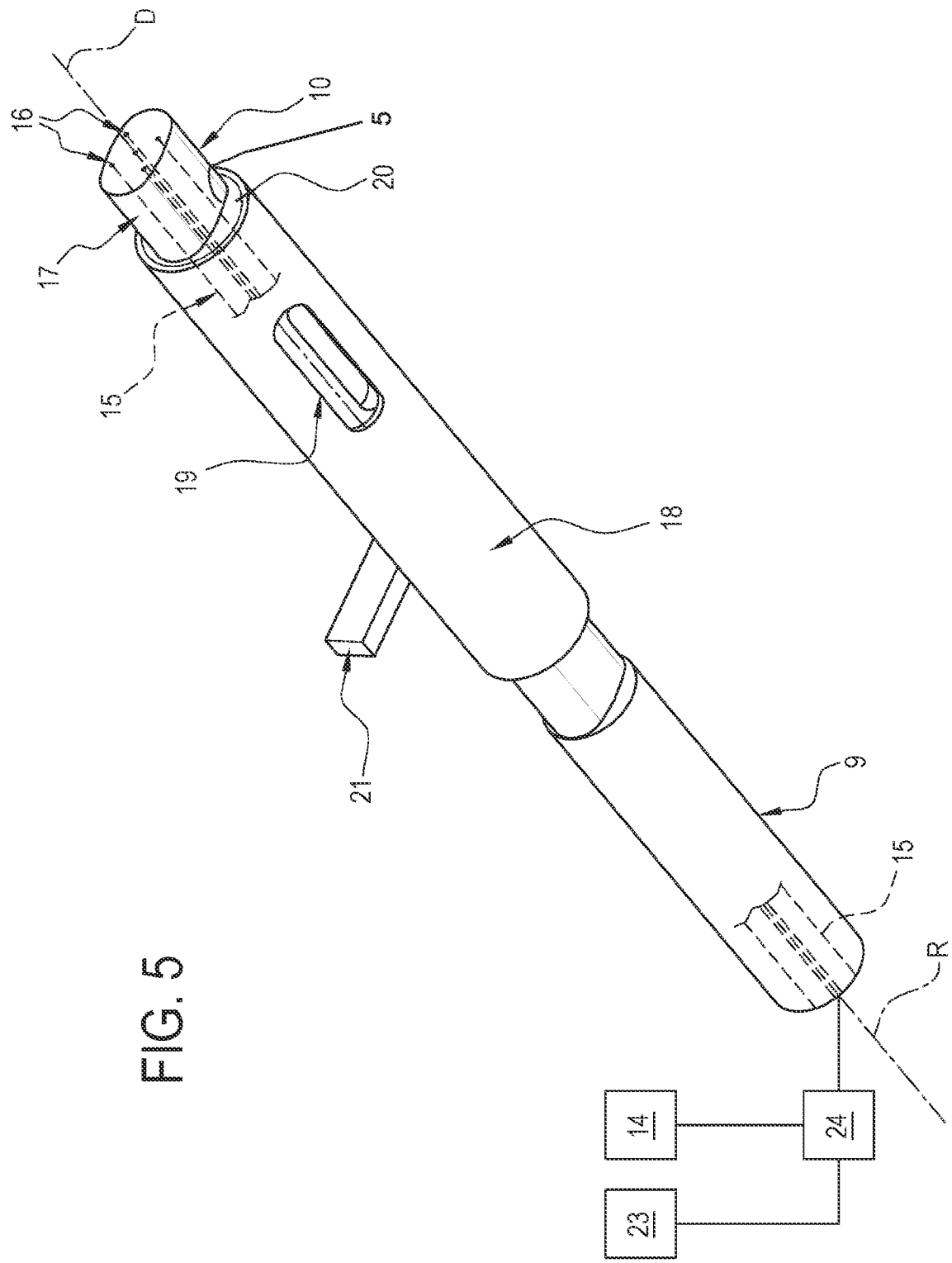
FIG. 5 illustrates a variant embodiment of the detail of FIG. 4.

With reference to the variant embodiment of FIG. 5, the unit 1 comprises means 23, schematically represented as a block 23, for supplying a mixture of dry saturated steam, preferably sterilized.

The unit 1 comprises means 24 for mixing the compressed air from the blowing system 14 with the dry saturated steam supplied by the respective supply means 23.

The mixture of steam and compressed air from the mixing means 24 is fed into the ducts 15 of the respective stem 10.

Advantageously, the mixture of steam and compressed air allows combining the power of the compressed air with the moistening property of the steam, allowing the filling 2 to be detached at the outlet 16.

Since the temperature of the filling 2 is lower than the temperature of the dry saturated steam, the latter has a heating effect on the filling 2 and facilitates its subsequent pasteurization.

Figure 4:
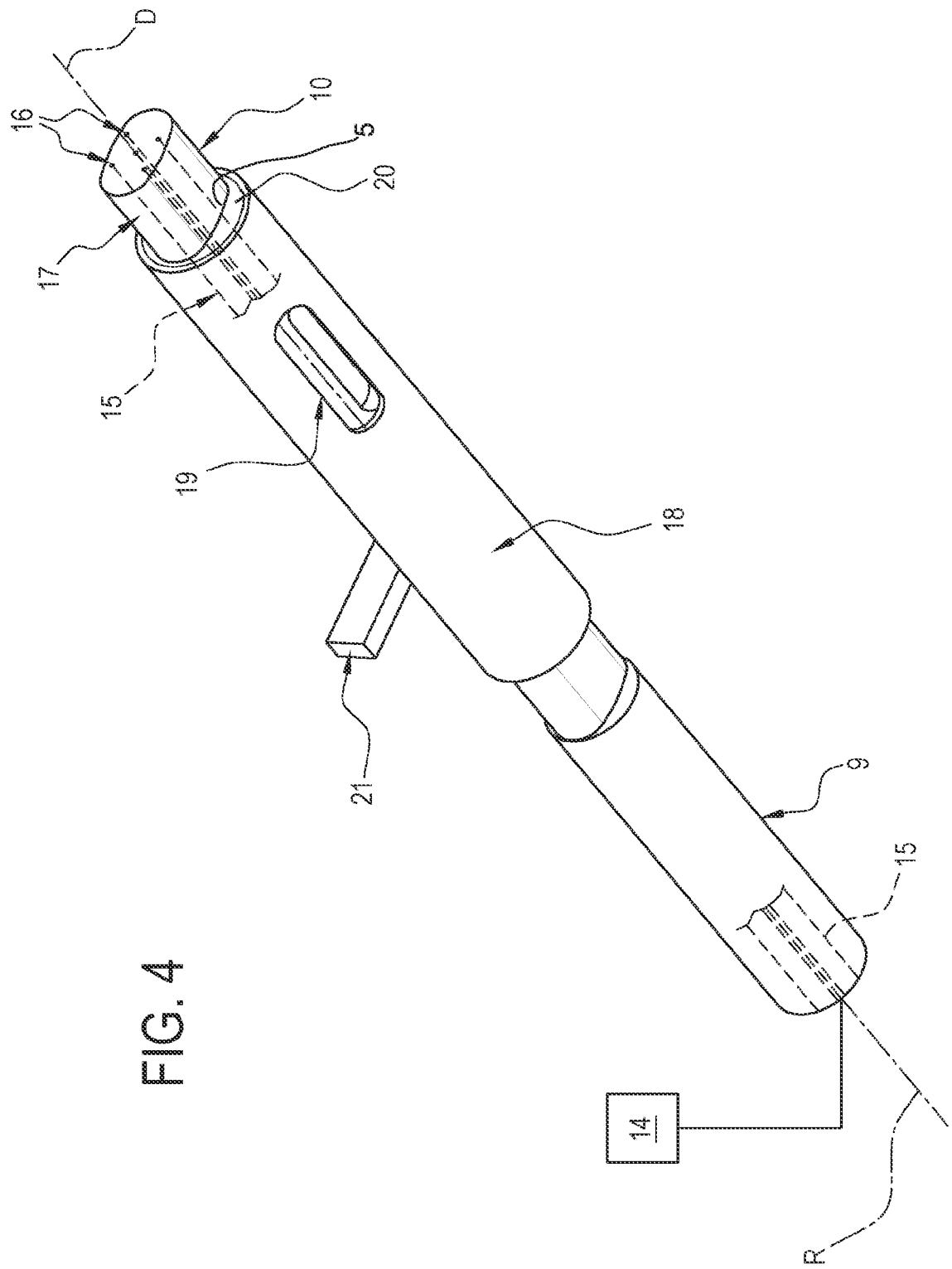
FIG. 4 illustrates a detail of the unit of FIG. 1 in a schematic perspective view, partly in blocks and with some parts cut away for greater clarity.

With reference in particular to FIGS. 1, 3 and 4, it may be noted that the unit 1 comprises a sleeve or bushing 18 fitted coaxially round the duct 5 and rotatable relative to the duct 5 about an axis of rotation R parallel to the direction D.

The sleeve 18 has an opening 19, which has the same shape as the inlet 6, and is rotatable about the axis R between a first operating position where the opening 19 is completely superposed on, or aligned with, the inlet 6, considering a radial direction, for example, and a second operating position where the opening 19 is at least partly angularly spaced from the inlet 6.

In practice, when the sleeve 18 is at the first operating position, the inlet 6 of the duct 5 is fully open, whereas when the sleeve 18 is at the second operating position, the inlet 6 is partly or fully closed.

The unit 1 comprises a sleeve 18 to regulate the cross section of the inlet 6 of the corresponding duct 5 in such a way as to regulate the amount of filling fed to filling station 200.

In order to allow rotating the bushing 18 to regulate the cross section of the inlet 6 on a stem 10 whose cross section is not circular, the unit 1 comprises a second sleeve or bushing 20 interposed between the bushing 18 and the stem 10; the bushing 20 constitutes a sort of liner for the stem 10.

Thus, in practice, the stem 10 slides in the bushing 20 while the bushing 18 rotates on the bushing 20.

For clarity of description, the term "circular" is used to mean a cross section whose circumference is defined by a set of points which are all equidistant from a single central point.

The term "non-circular cross section" means a cross section which does not meet this geometric definition.

As illustrated, the sleeve 20 has an outside surface 20a whose cross section has a circular profile and an inside surface 20b whose cross section has an oval profile, which preferably substantially corresponds to the oval outside profile of the stem 10.

The oval profile is an exemplary shape of a non-circular cross section. Other examples of non-circular cross sections might be polygonal profiles, specifically rectangular, curvilinear or mixed profiles.

The profile of the inside surface 20b has, at the sides, looking at FIG. 3, a first and a second circular stretch 25, 26 between 6 mm and 18 mm in diameter.

At the top and bottom of it, looking at FIG. 3, the profile of the inside surface 20b has a central stretch 27 having an at least partly circular profile between 8 mm and 20 mm in diameter.

The sleeve 18 is fitted loosely over the bushing 20 and is free to rotate thereon.

The bushing 20 is locked relative to the other components of the unit 1, axially and radially, for example by means of a bar 21 engaged with the bushing 20 itself.

As illustrated, the bushing 20 has an opening 22 which has the same shape as the inlet 6, and is superposed on, or aligned with, the inlet 6, in a radial direction.

That way, when the sleeve 18 is at the first operating position, access to the inside of the duct 5 is maximized compared to the other configurations or positions adopted by the bushing 18.

In practice, the channel 8 is in communication with the inside of the duct 5, or with the inside of the bushing 20, through the openings 19 and 22.

Rotating the sleeve 18 to move the opening 19 relative to the channel 8 and the opening 22 adjusts or regulates the size of the cross section through which the filling is fed into the duct 5.

In use, the screw feeder 4 pushes the filling 2 forward from the hopper 3 towards the inlets 6 of the ducts 5, thereby, in practice, creating a pressure inside the unit 1.

When the stem 10 moves to the retracted position, considering the single duct 5 and irrespective of the position of the sleeve 18 relative to the bushing 20, a quantity of filling 2 enters the duct 5 and, more specifically, the sleeve 20.

In an example embodiment, the screw feeder 4 is intermittently power driven and when the inlets 6 are open, moves through a predetermined angle, thereby feeding a measured quantity of filling 2.

The stem 10, when it moves to the extracted position, intercepts the charge of filling 2 and pushes it forward in the direction D until it reaches the sheet 100 of dough.

In known manner, a cutter cuts a piece or square of dough onto the centre of which the filling pushed by the stem 10 is placed.

Rotating the sleeve 18 allows adjusting the size of the inlet into the duct 5, thus regulating the quantity of filling insertable therein, so that all the ducts 5, whether close to or far from the screw feeder 4 deliver the filling in uniform quantities to the filling station 200.

The special shape of the stem and of the bushing allows optimizing the size of the charging cross section for the filling in the feeding unit and, at the same time, allows fillings containing whole chunks (mushrooms, peas, etc) to pass through more smoothly and delivering the filling 2 more uniformly to the dough.

The air jets improve expulsion of the filling, optimizing feed even in the case of pasta of relatively large size or containing fillings comprising whole or relatively large chunks.

The invention claimed is:

1. A feeding unit for feeding a food product for use with a machine for making filled pasta, the feeding unit comprising:
    a feed duct having a main direction of extension, an outlet and an inlet, located on a lateral surface of the feed duct, for the food product;
    a feed channel;
    a first sleeve fitted coaxially over the feed duct and including a first opening positioned between the feed channel and the feed duct, the first sleeve and first opening rotatable relative to the feed channel about an axis of rotation R in order to regulate an effective cross section of the inlet;
    an actuator comprising a stem positioned in the feed duct and movable along the main direction of extension between a first, retracted operating position to allow the food product to enter the feed duct and a second, forward operating position to push a portion of the food product out of the feed duct through the outlet,
    a second sleeve, fitted between the first sleeve and the stem, with the feed duct positioned within the second sleeve, the stem slidable inside the second sleeve, and the first sleeve rotatable on the second sleeve, the second sleeve including a second opening positioned between the feed channel and the feed duct, the second opening positioned to establish a flow path from the feed channel to the feed duct via the first opening.

2. The feeding unit according to claim 1, wherein the second sleeve has an outside surface having a cross section that is circular in profile and an inside surface having a cross section that is not circular in profile, the stem having a cross section having an outer profile corresponding to the profile of the cross section of the inside surface of the second sleeve.

3. The feeding unit according to claim 2, wherein the inside surface of the second sleeve has a cross section with an oval profile.

4. The feeding unit according to claim 3, wherein the profile of the cross section of the inside surface comprises a first and a second circular stretch between 6 mm and 18 mm in diameter.

5. The feeding unit according to claim 4, wherein the profile of the cross section of the inside surface comprises a third circular stretch between 6 mm and 18 mm in diameter.

6. The feeding unit according claim 1, wherein the stem has an oval cross section with a first and a second end portion having a circular profile between 6 mm and 18 mm in diameter.

7. The feeding unit according to claim 1, wherein the stem has an oval cross section with a central portion having an at least partly circular profile between 8 mm and 20 mm in diameter.

8. The feeding unit according to claim 1, wherein the stem includes an internal blowing duct having an outlet on a head of the stem.

9. The feeding unit according to claim 1, and further comprising:
    a screw feeder for feeding the food product to the inlet;
    a hopper for storing the food product, the feed channel positioned between the hopper and the inlet, the screw feeder being operative between the hopper and the inlet to push the food product along the feed channel.

* * * * *